(12) United States Patent
Seo

(10) Patent No.: US 10,524,424 B2
(45) Date of Patent: Jan. 7, 2020

(54) ROTOR APPARATUS FOR BALER

(71) Applicant: Kyoung-Jin Seo, Jeollanam-do (KR)

(72) Inventor: Kyoung-Jin Seo, Jeollanam-do (KR)

( * ) Notice: Subject to any disclaimer, the term of this patent is extended or adjusted under 35 U.S.C. 154(b) by 139 days.

(21) Appl. No.: 15/569,817

(22) PCT Filed: Mar. 14, 2017

(86) PCT No.: PCT/KR2017/002724
§ 371 (c)(1),
(2) Date: Oct. 27, 2017

(87) PCT Pub. No.: WO2017/204444
PCT Pub. Date: Nov. 30, 2017

(65) Prior Publication Data
US 2018/0220585 A1    Aug. 9, 2018

(30) Foreign Application Priority Data

May 27, 2016 (KR) .......................... 10-2016-0065543

(51) Int. Cl.
*A01F 15/10* (2006.01)
*A01D 89/00* (2006.01)
*A01F 15/07* (2006.01)

(52) U.S. Cl.
CPC ............ *A01F 15/106* (2013.01); *A01F 15/07* (2013.01); *A01D 89/00* (2013.01)

(58) Field of Classification Search
CPC .. A01D 41/1243; A01D 89/008; A01D 90/04; A01F 12/04; A01F 15/10; A01F 15/08; A01F 15/07; A01F 15/106; A01F 29/02

USPC ...... 56/190, 249, 341, 364; 100/65, 88, 144, 100/177; 460/112
See application file for complete search history.

(56) References Cited

U.S. PATENT DOCUMENTS

| | | | | |
|---|---|---|---|---|
| 6,679,041 B2 * | 1/2004 | Viaud | ..................... | A01F 15/10 56/16.4 R |
| 6,769,239 B1 * | 8/2004 | Webb | ..................... | A01D 90/04 56/341 |
| 6,886,312 B1 * | 5/2005 | Inman | ..................... | A01F 25/183 100/144 |
| 7,867,072 B2 * | 1/2011 | Lauwers | ............ | A01D 41/1243 460/112 |
| 8,205,424 B1 * | 6/2012 | Lang | ..................... | A01D 90/04 56/341 |

(Continued)

FOREIGN PATENT DOCUMENTS

| JP | 3924997 B2 | 6/2007 |
|---|---|---|
| KR | 10-1061920 B1 | 9/2011 |

(Continued)

*Primary Examiner* — Robert E Pezzuto
(74) *Attorney, Agent, or Firm* — Rabin & Berdo, P.C.

(57) ABSTRACT

A rotor apparatus for a baler is provided such that hay on the ground is picked up by a hay pick-up apparatus installed at the side of the baler and the picked-up hay is fed without being wound around the rotor feeding the hay to the region of the roll forming apparatus, whereby the hay of the hay pick-up apparatus is fed to the region of the roll forming apparatus quickly, precisely, and evenly. In addition, a load of the rotor is minimized when the hay is fed to the region of the roll forming apparatus, thereby extending the service life of the rotor.

14 Claims, 15 Drawing Sheets

(56) References Cited

U.S. PATENT DOCUMENTS 10,039,237 B2 * 8/2018 Smith .................. A01D 89/008
2014/0109542 A1 4/2014 McClure et al.

FOREIGN PATENT DOCUMENTS

KR 10-1386440 B1 4/2014
KR 10-2016-0048520 A 5/2016

* cited by examiner

ROTOR APPARATUS FOR BALER

TECHNICAL FIELD

The present invention relates generally to a rotor apparatus for a baler configured to roll rice straw or grass (hereinafter referred to as "hay") on a paddy field or grass field into a cylinder shape and discharge it onto the field, wherein a hay pick-up apparatus of the baler picks up hay from the ground and the rotor apparatus feeds the picked-up hay to a region of a roll forming apparatus.

BACKGROUND ART

In general, rice straw or grass is used as livestock feed, thus the rice straw that has been left over from harvesting rice is actively collected. For this reason, various types of machines have been developed and used for automatically collecting rice straw or grass, and compressing and binding the collected rice straw and grass together.

As an example of a conventional grass and rice straw collecting apparatus, a baler (round baler) is connected to the rear of an agricultural tractor used mainly in paddy fields and grass fields. While the agricultural tractor operates, forage crops such as rice straw and grass are collected by the round baler. The round baler is configured with a collecting part for collecting such forage crops, and a baling part for compressing and baling rice straw or grass collected through the collecting part.

Accordingly, the agricultural tractor operates in paddy fields and grass fields, and rice straw and grass are collected through the collecting part of the round baler and fed to the inside of the round baler. Then, the fed rice straw or grass is compressed at the baling part and is bound together using a net or vinyl when it reaches a certain size, whereby it can be used as bale silage.

However, a grass and rice straw winding-prevention apparatus of a rotor of the conventional round baler for collecting rice straw and grass is problematic in that when the forage crops collected at the collecting part are fed to the baler, the crops are caught in gaps defined between internal components such as the rotor, rollers, etc. that are provided inside the collecting apparatus and may clog the gaps. Further, the crops may be fed in a direction other than a predetermined feeding direction, which often causes failure, breakage, or malfunction of the rotor and the rollers of the grass and rice straw collecting apparatus.

In addition, grass and rice straw are wound around the rotor in the collection part, so collection and feeding of the forage crops may not be continuously efficiently performed, which leads to interruption of collection work of grass and rice straw.

Consequently, research and development are required in order to realize more rapid and efficient collection of grass and rice straw.

DISCLOSURE

Technical Problem

Accordingly, the present invention has been made keeping in mind the above problems occurring in the related art, and objects of the present invention are as follows.

First, the present disclosure provides a rotor apparatus for a baler, in which hay on the ground is picked up by a hay pick-up apparatus installed at the side of the baler and the picked-up hay is fed without being wound around the rotor feeding the hay to the region of a roll forming apparatus.

Second, the present disclosure provides a rotor apparatus for a baler, in which the hay of the hay pick-up apparatus is fed to the region of the roll forming apparatus quickly, precisely, and evenly.

Third, the present disclosure provides a rotor apparatus for a baler, in which a load of the rotor is minimized when the hay is fed to the region of the roll forming apparatus, whereby failure of the power source supplying a rotational power to the rotor is minimized.

Fourth, the present disclosure provides a rotor apparatus for a baler, in which the service life of the rotor is extended.

Technical Solution

In order to achieve the above objects, according to one aspect of the present invention, there is provided a rotor apparatus for a baler.

The baler is configured such that hay V is picked up from the ground by a hay pick-up apparatus P and the picked-up hay is fed to a region of a roll forming apparatus M.

The rotor apparatus R includes a rotary shaft 200, the rotary shaft including: a power input shaft 220 provided at a first end of the hollow pipe and having spline teeth 221 circumferentially formed on an outside end of the power input shaft, the power input shaft rotating the rotor apparatus by receiving external power; and a power output shaft 230 provided at a second end of the hollow pipe and having spline teeth 231 circumferentially formed on an outside end of the power output shaft, the power output shaft transmitting power of the rotor apparatus to outside.

The hollow pipe may be provided at opposite ends thereof with margin portions 211, respectively, and a plurality of hay feeding blade assemblies 300 each having a plurality of sharp tips 330 may be arranged on the hollow pipe at a position between the margin portions such that the tips of the hay feeding blades assemblies are offset from each other with respect to a lengthwise direction of the hollow pipe.

Each of the margin portions provided at the opposite ends of the hollow pipe may be coupled with a foreign substance inflow prevention cover 400 preventing hay and foreign substances from invading into the opposite ends of the hollow pipe, and having an opening 410 formed at a central portion thereof, piece holes 420 formed around a periphery of the opening 410, a margin portion reception part 440 circumferentially formed on an inner surface of the foreign substance inflow prevention cover at a position outside the piece holes, and a bracket 450 installed on an outer surface of the foreign substance inflow prevention cover.

A width W of the margin portion 211 may be smaller than a depth W' of the margin portion reception part 440 such that a front end of the margin portion is prevented from being in contact with an inside end of the margin portion reception part 440.

Advantageous Effects

The rotor apparatus for the baler according to the present invention having the above-described characteristics has the following effects.

First, hay on the ground can be picked up by a hay pick-up apparatus installed at the side of the baler and the picked-up hay can be fed without being wound around the rotor feeding the hay to the region of a roll forming apparatus. Second, the hay of the hay pick-up apparatus can be fed to the region of the roll forming apparatus quickly, precisely, and evenly.

Third, a load of the rotor can be minimized when the hay is fed to the region of the roll forming apparatus, whereby failure of the power source supplying a rotational power to the rotor can be minimized. Fourth, the service life of the rotor can be extended.

BEST MODE

Figure 1:
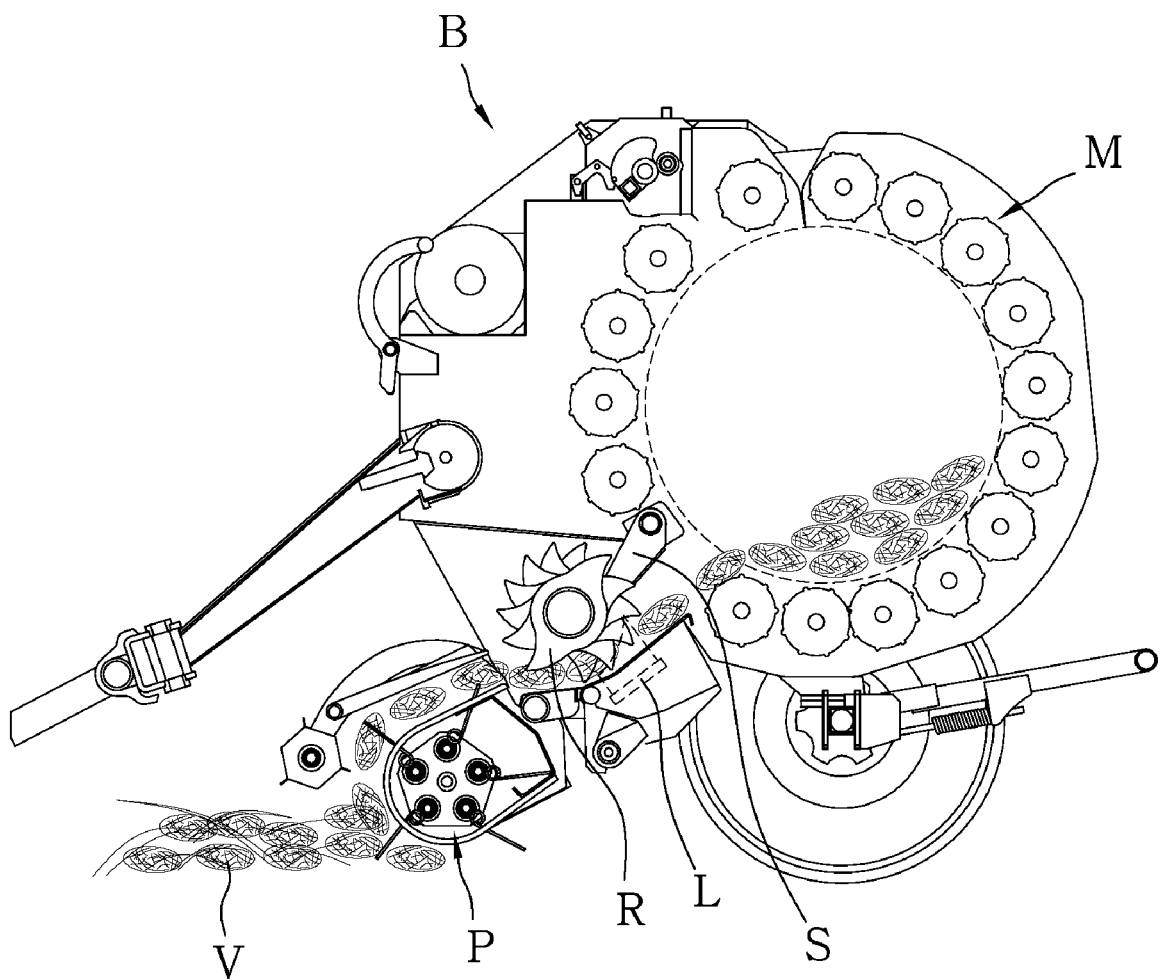
FIG. 1 is a side schematic view showing a state in which a rotor apparatus of the present invention is installed at a baler.

The present invention relates to a rotor apparatus R for a baler B configured to roll hay on the paddy field or grass field into a cylinder shape and discharge it onto the field for use as livestock feed, wherein as shown in FIG. 1, hay V on the ground is picked up by a hay pick-up apparatus P and the picked-up hay V is fed by the rotor apparatus to a region of the roll forming apparatus M.

A process of rolling the hay V into a cylinder shape and discharging it from the baler B provided with the rotor apparatus R will be briefly described as follows.

The hay on the paddy field or grass field is picked up by the hay pick-up apparatus P and the picked-up hay of the hay pick-up apparatus P is fed by the rotor apparatus R to the region of the roll forming apparatus M. Here, the hay is cut to a predetermined length by a hay cutter L installed at a lower portion of the rotor apparatus R, and then all of the cut hay is fed by a scraper S to the region of the roll forming apparatus M without being released outside the region of the roll forming apparatus M, whereby the hay is rolled into a cylinder shape and discharged onto the ground.

The cutting width of the hay cut to a predetermined length may be determined to maintain the width of two hay feeding blade assemblies 300 arranged on a hollow pipe 210 lengthwise as shown in FIGS. 4 to 8a.

The hay pick-up apparatus P, the roll forming apparatus M, the hay cutter L, and the scraper S that constitute the baler B described above are general techniques, so a detailed configuration and operation effects thereof are omitted. The rotor apparatus R, which is a main feature of the present invention, will now be described in detail.

Figure 2:
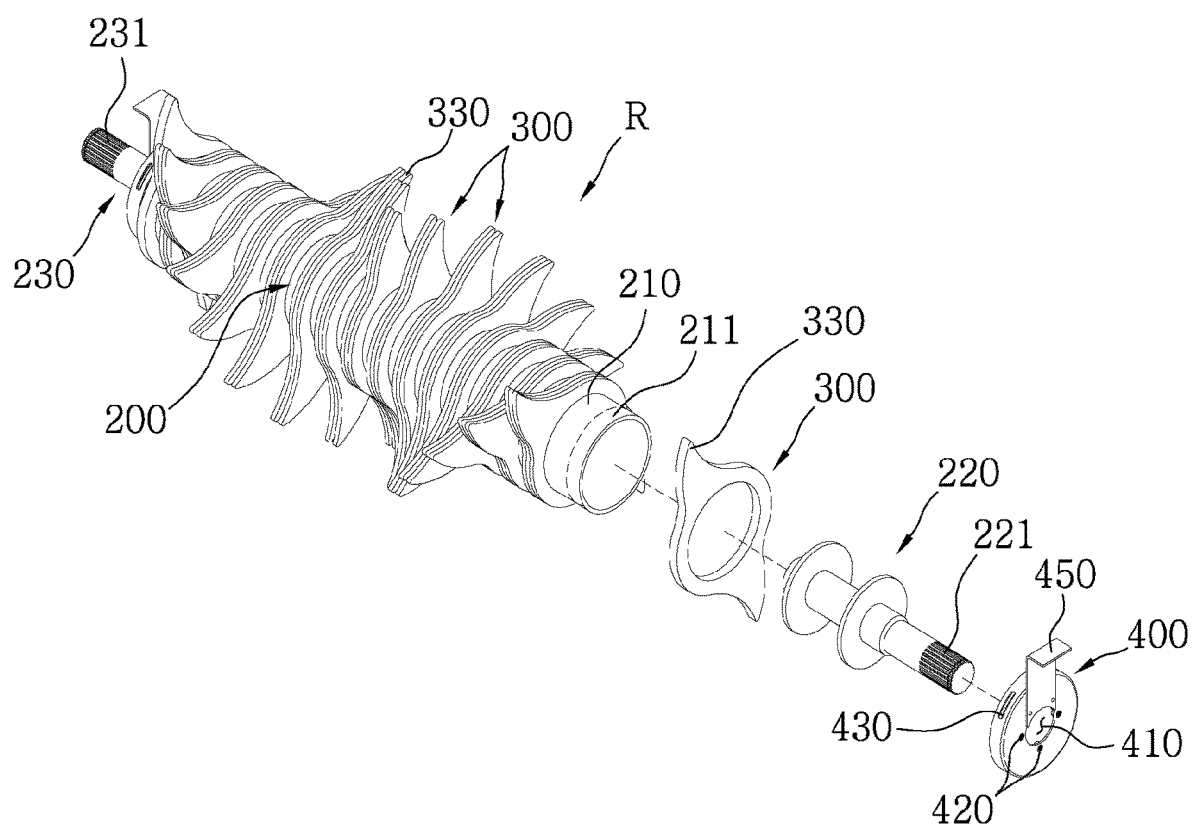
FIG. 2 is an exploded perspective view showing the rotor apparatus for the baler of the present invention.
Figure 3:
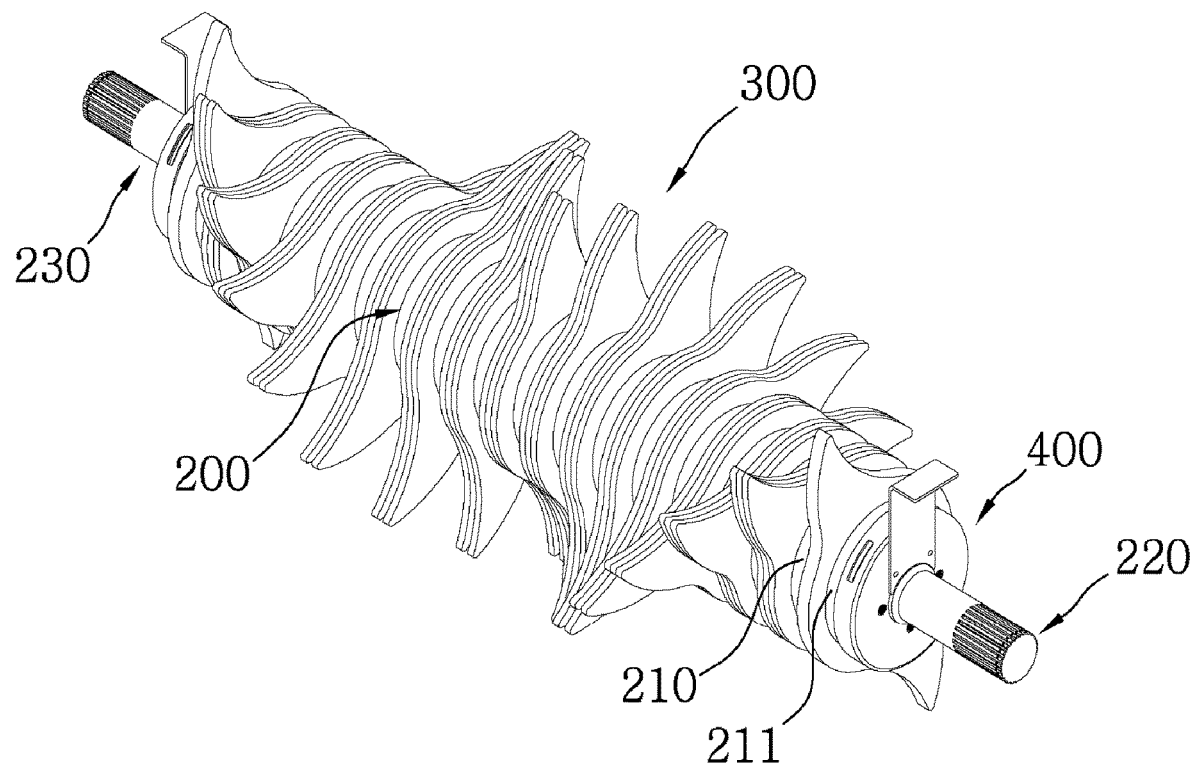
FIG. 3 is a combined perspective view showing the rotor apparatus for the baler of the present invention.

As shown in FIG. 2, the rotor apparatus R for the baler according to the present invention is configured such that a power input shaft 220 is provided at a first end of the hollow pipe 210, the power input shaft having spline teeth 221 circumferentially formed on an outside end thereof, and rotating the rotor apparatus R by receiving external power.

The external power described above means a power source (not shown) mounted on the baler, and a power transmission means (not shown) for transmitting rotational power of the power source to the spline teeth 221 of the power input shaft 220 connects the power source and the spline teeth 221.

A power output shaft 230 is provided at a second end of the hollow pipe 210, the power output shaft transmitting rotational power of the rotor apparatus R to the outside, and having spline teeth 231 circumferentially formed on an outside end thereof.

The outside to which the rotational power of the rotor apparatus R described above is transmitted means an external device that is located near the hay pick-up apparatus P or the rotor apparatus R of the baler and which requires rotational power.

A power transmission means (not shown) for transmitting rotational power of the power output shaft 230 connects the spline teeth 231 of the power output shaft 230 and the hay pick-up apparatus P or the external device requiring rotational power.

Figure 4A:
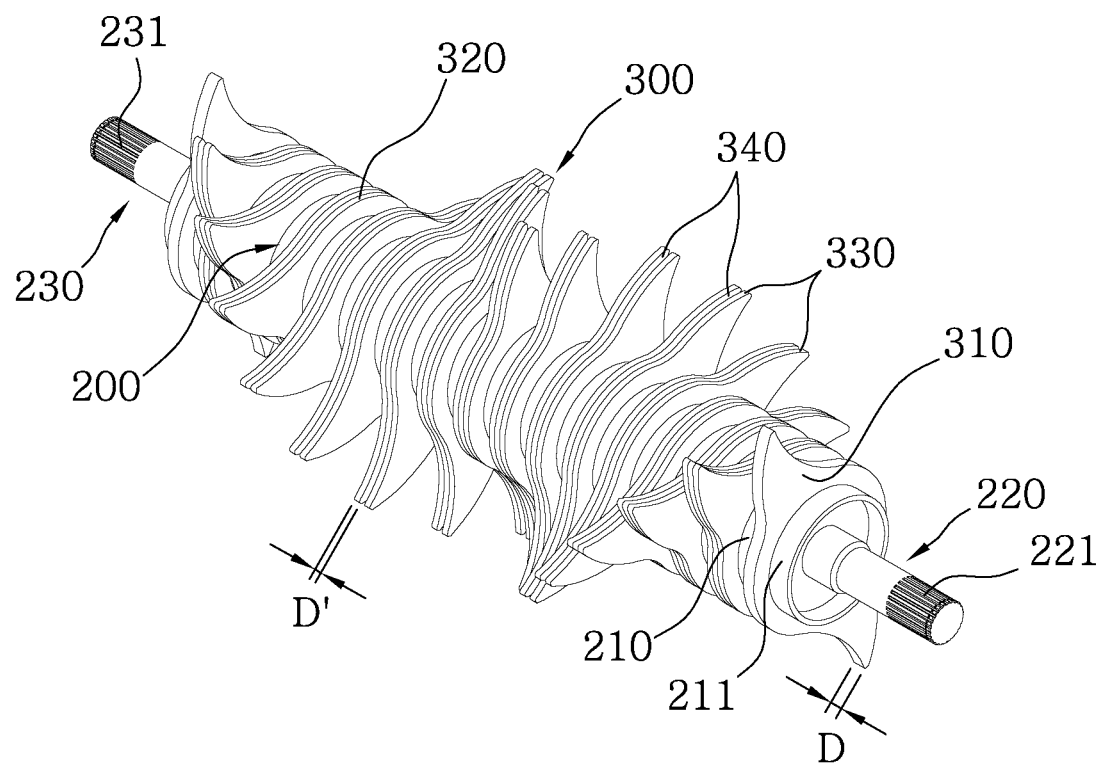
FIGS. 4a and 4b are a perspective view and a side view showing a first embodiment of the rotor apparatus for the baler of the present invention.
Figure 4B:
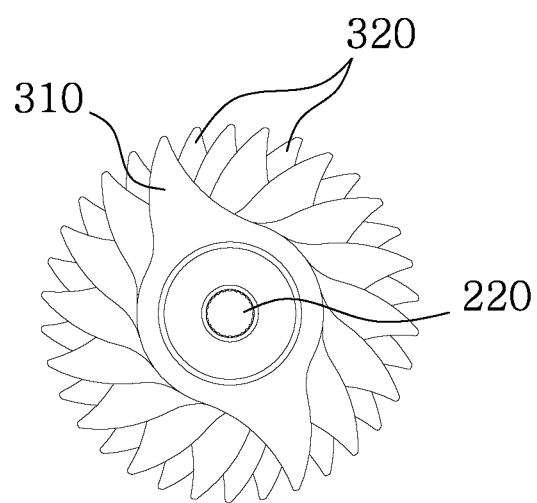

In addition, as shown in FIG. 4a, the hollow pipe 210 is provided at the opposite ends thereof with margin portions 211, respectively, and a plurality of hay feeding blade assemblies 300 each having a plurality of sharp tips 330 are arranged on the hollow pipe at a position between the margin portions 211. As shown in FIGS. 4b, the tips 330 of the hay feeding blade assemblies 300 are offset from each other with respect to the lengthwise direction of the hollow pipe 210.

The reason why the tips 330 of the feeding blade assemblies 300 are offset from each other with respect to the lengthwise direction of the hollow pipe 210 will be described. As shown in FIG. 1, when the hay feeding blade assemblies 300 feed the hay V to the region of the roll forming apparatus M, the hay passes through the hay cutter L and is cut to a predetermined length, and then the cut hay is fed to the region of the roll forming apparatus M.

Here, in the case that the tips 330 of the plurality of hay feeding blade assemblies 300 are arranged at the same position, the plurality of hay feeding blade assemblies 300 arranged at the same position simultaneously feeds the hay V of the hay pick-up apparatus P to pass the hay through the hay cutter L. As a result, a load is more likely to be applied to a rotary shaft 200 than when the hay feeding blade assemblies 300 passes the hay sequentially one by one.

When the load is applied to the rotary shaft 200 as described above, the rotary shaft 200 is deformed and the power source and the power transmission means that transmit power to the rotary shaft 200 are damaged or broken. Accordingly, in order to minimize the load on the rotary shaft 200, the tips 330 of the hay feeding blade assemblies 300 are offset from each other with respect to the lengthwise direction of the hollow pipe 210.

Consequently, when the tips 330 of the feeding blade assemblies 300 are offset from each other with respect to the lengthwise direction of the hollow pipe 210 as described above, it is possible to protect the rotary shaft 200 and to protect the power source that transmits rotational power to the power input shaft 220.

Further, the reason why the tips 330 of the hay feeding blade assemblies 300 are sharpened is that the hay V located in the hay pick-up apparatus P is easily collected and efficiently fed to the region of the roll forming apparatus M.

Each hay feeding blade of the hay feeding blade assemblies 300 described above has a structure in which an opening is formed at a central portion such that the hay feeding blade is tightly fitted to the hollow pipe 210, and extended portions extend from the opening to the sharp tips 330 to become gradually narrower in width from the opening to the tips 330.

Further, a foreign substance inflow prevention cover 400 for preventing hay and foreign substances from invading into the opposite ends of the hollow pipe 210 is coupled to each of the margin portions 211 formed at the opposite ends of the hollow pipe 210. The foreign substance inflow prevention cover 400 has a structure in which an opening 410 is formed at a central portion, and piece holes 420 are formed around the periphery of the opening 410. A margin portion reception part 440 receiving therein the margin portion 211 is formed circumferentially on the inner surface of the foreign substance inflow prevention cover 400 at a position outside the piece holes, and a bracket 450 is installed on the outer surface of the foreign substance inflow prevention cover 400.

The reason why the foreign substance inflow prevention covers 400 are coupled to the margin portions 211 is that the hay V is wound around the hay feeding blade assembles 300 arranged at the outermost sides of the hollow pipe 210 in the process of feeding the hay of the hay pick-up apparatus P to the region of the roll forming apparatus M by the rotor apparatus R. Accordingly, a rotary load is applied to the rotary shaft 200, which causes a problem of failure of the power source. Thus, in order to solve this problem, the foreign substance inflow prevention covers 400 are coupled to the margin portions 211.

Particularly, a length from a first end to a second end of the hay pick-up apparatus P, which picks up the hay V on the ground of a paddy field or a grass field, is longer than a length from a first end to a second end of the hollow pipe 210 provided with the hay feeding blade assemblies 300, so the hay V is concentrated on the hay feeding blade assemblies 300 arranged at the outermost sides of the hollow pipe 210.

The foreign substance inflow prevention cover 400 has the opening 410 formed at the central portion thereof. This is because the foreign substance inflow prevention covers 400 must be fitted over the power input shaft 220 and the power output shaft 230 to be coupled to the margin portions 211. Accordingly, the opening 410 is formed at the central portion of the foreign substance inflow prevention cover 400.

Further, the piece holes 420 are formed around the periphery of the opening 410 of the foreign substance inflow prevention cover 400. This is to fix the foreign substance inflow prevention cover 400 to a side of the baler using a piece (bolt).

In addition, the margin portion reception part 440 receiving therein the margin portion 211 is formed circumferentially on the inner surface of the foreign substance inflow prevention cover 400 at a position outside the piece holes 420. The reason for forming the margin portion reception part 440 is to prevent the hay from being wound around the margin portion 211 and to protect the margin portion 211.

The bracket 450 is installed on the outer surface of the foreign substance inflow prevention cover 400. The reason for installing the bracket 450 is to fix the foreign substance inflow prevention cover 400 more securely and firmly to the side of the baler.

The arrangement of a first embodiment of the hay feeding blade assemblies 300 arranged on the hollow pipe 210 in the rotor apparatus for the baler according to the present invention as described above will be described. As shown in FIG. 4a, each of the hay feeding blade assemblies 300 arranged at the opposite outermost sides of the hollow pipe 210 is composed of one hay feeding blade 310, and each of remaining hay feeding blade assemblies is composed of two hay feeding the blades 320 facing each other to define a space 340 therebetween.

Here, the thickness D of the hay feeding blade 310 arranged at each of the opposite outermost sides of the hollow pipe 210 may be larger than the thickness D' of either one of the two hay feeding blades 320 of the remaining hay feeding blade assemblies. Accordingly, the desired rigidity is imparted to one hay feeding blade 310 arranged at each of the opposite outermost sides of the hollow pipe 210 so that the hay feeding blade 310 is prevented from deformation.

Figure 5A:
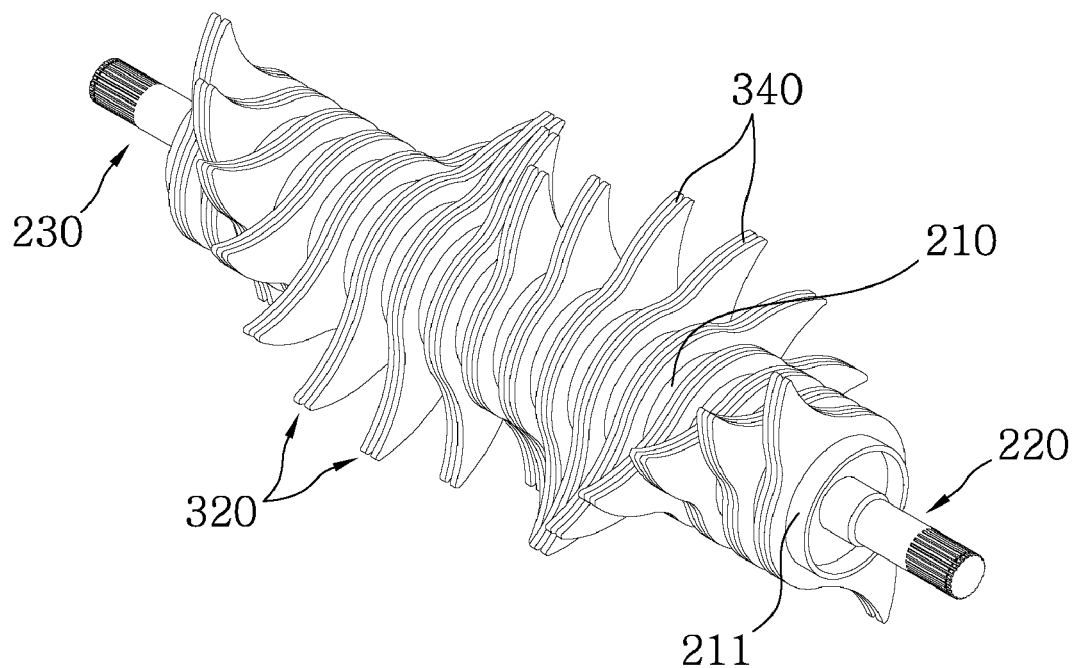
FIGS. 5a and 5b are a perspective view and a side view showing a second embodiment of the rotor apparatus for the baler of the present invention.
Figure 5B:
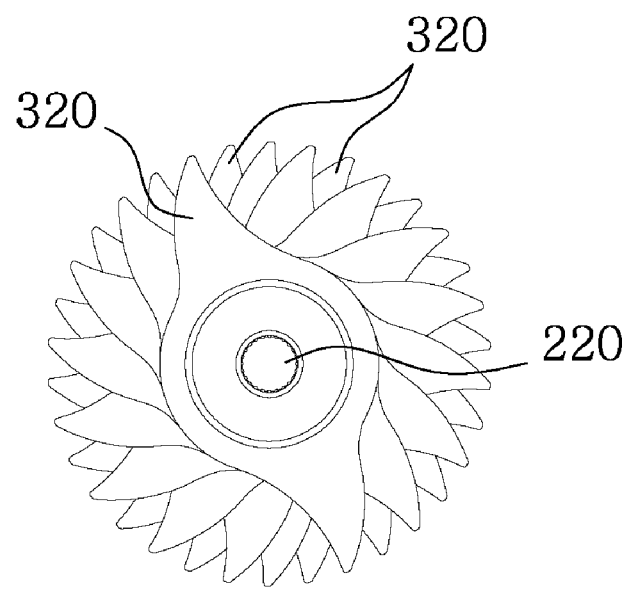

The arrangement of a second embodiment of the hay feeding blade assemblies 300 arranged on the hollow pipe 210 in the rotor apparatus for the baler according to the present invention will be described. As shown in FIG. 5a, each of the hay feeding blade assemblies 300 arranged on the hollow pipe 210 at a position between the margin portions 211 is composed of two hay feeding blades 320 having the same size and shape and facing each other to define a space 340 therebetween, whereby the desired rigidity is imparted to individual hay feeding blade.

Figure 6A:
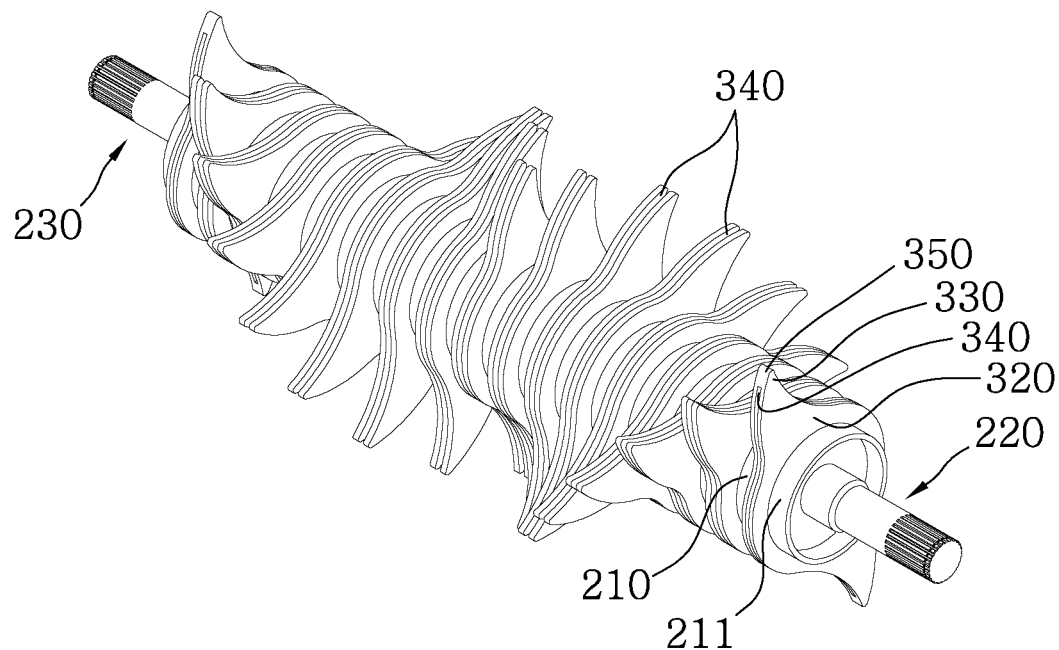
FIGS. 6a and 6a are a perspective view and a side view showing a third embodiment of the rotor apparatus for the baler of the present invention.
Figure 6B:
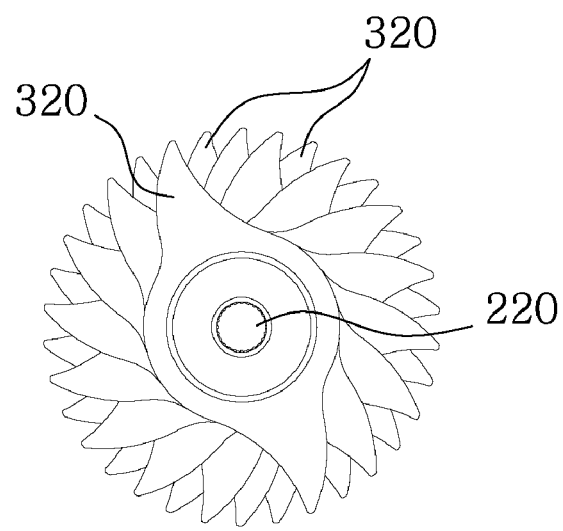

The arrangement of a third embodiment of the hay feeding blade assemblies 300 arranged on the hollow pipe 210 in the rotor apparatus for the baler according to the present invention will be described. As shown in FIG. 6a, in addition to the arrangement of FIG. 5a, the space 340 of the two hay feeding blades 320 of the hay feeding blade assemblies arranged at the opposite outermost sides of the hollow pipe 210 is partially closed by tip reinforcing holders 350 at positions around each of the tips, whereby the outermost hay feeding blade assemblies 300 are prevented from deformation and the desired rigidity is imparted thereto.

Figure 7A:
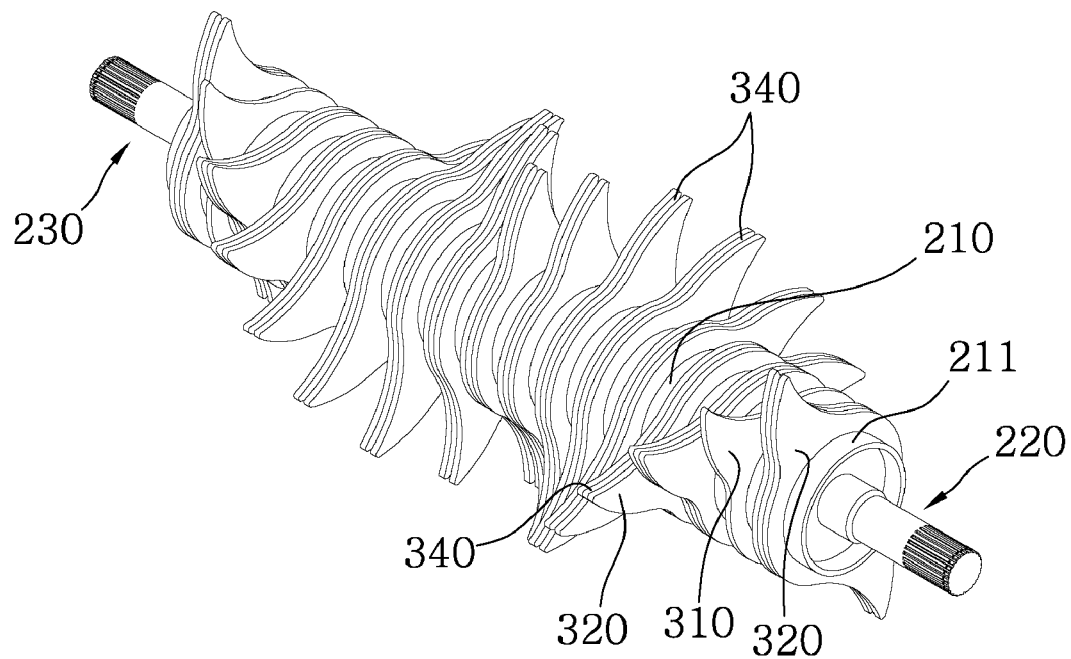
FIGS. 7a and 7b are a perspective view and a side view showing a fourth embodiment of the rotor apparatus for the baler of the present invention.
Figure 7B:
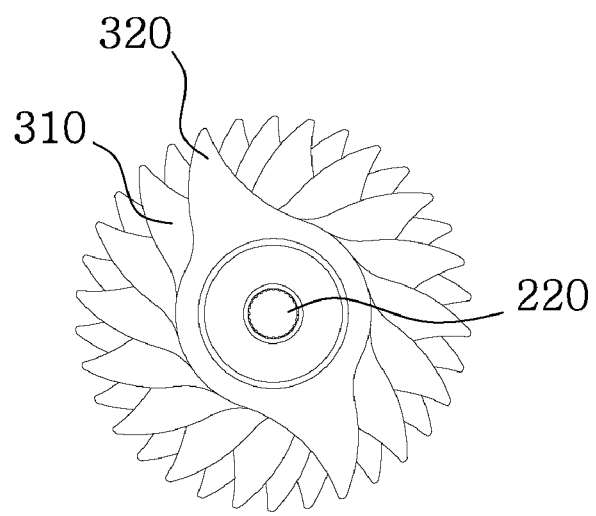

The arrangement of a fourth embodiment of the hay feeding blade assemblies 300 arranged on the hollow pipe 210 in the rotor apparatus for the baler according to the present invention will be described. As shown in FIG. 7a, each of the hay feeding blades of the hay feeding assemblies arranged at the opposite outermost sides of the hollow pipe 210 is composed of two hay feeding blades 320 facing each other to define a space 340 therebetween, and each of the hay feeding blades of the hay feeding assemblies arranged at the second opposite outermost sides of the hollow pipe 210 is composed of one hay feeding blade 310. Each of intermediate hay feeding blade assemblies arranged between the hay feeding blades 310 may be composed of two hay feeding blades 320 facing each other to define a space 340 therebetween.

Figure 8A:
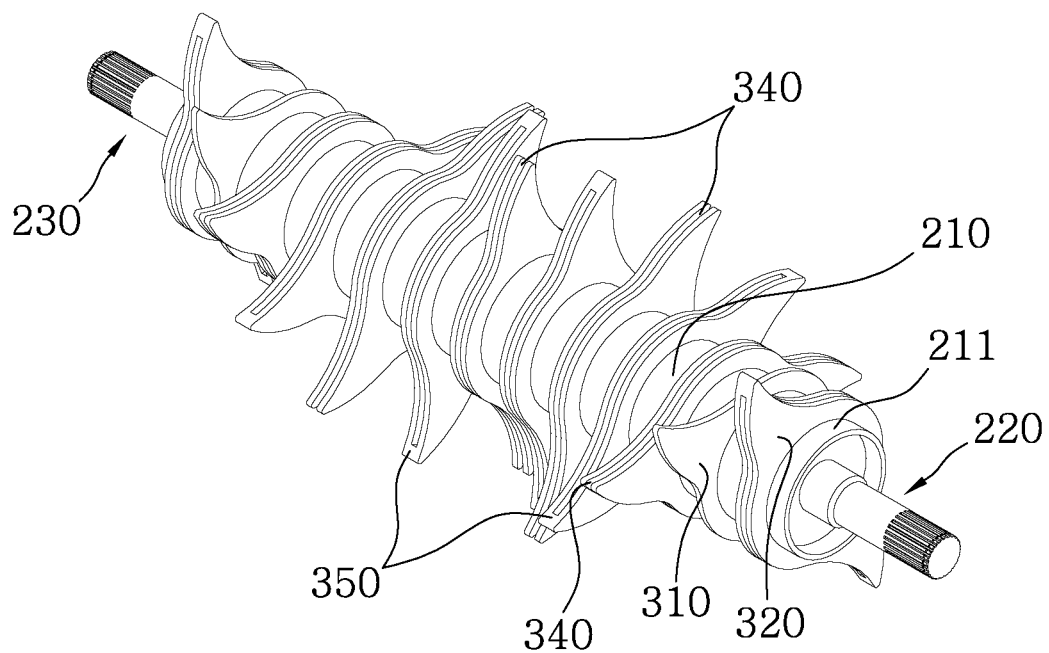
FIGS. 8a and 8a are a perspective view and a side view showing a fifth embodiment of the rotor apparatus for the baler of the present invention.
Figure 8B:
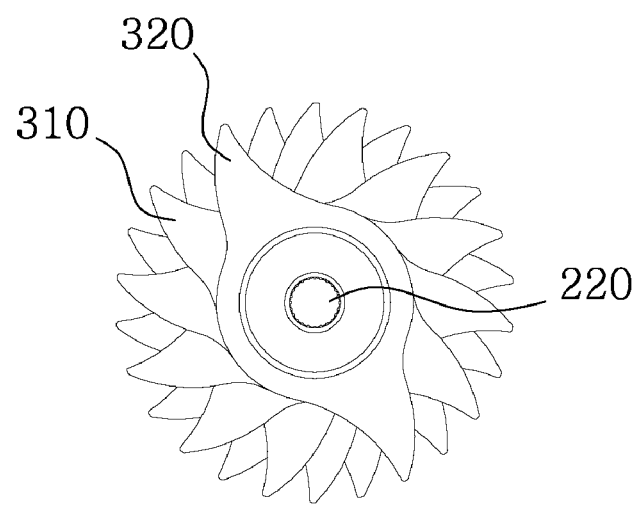

The arrangement of a fifth embodiment of the hay feeding blade assemblies 300 arranged on the hollow pipe 210 in the rotor apparatus for the baler according to the present invention will be described. As shown in FIG. 8a, in addition to the arrangement of FIG. 7a, a plurality of tip reinforcing holders 350 partially close the spaces defined between the hay feeding blades of the hay feeding blade assemblies arranged at the opposite outermost sides of the hollow pipe 210, and partially alternately close the spaces defined between the hay feeding blades of the intermediate hay feeding blade assemblies at positions around the tips.

Figure 9:
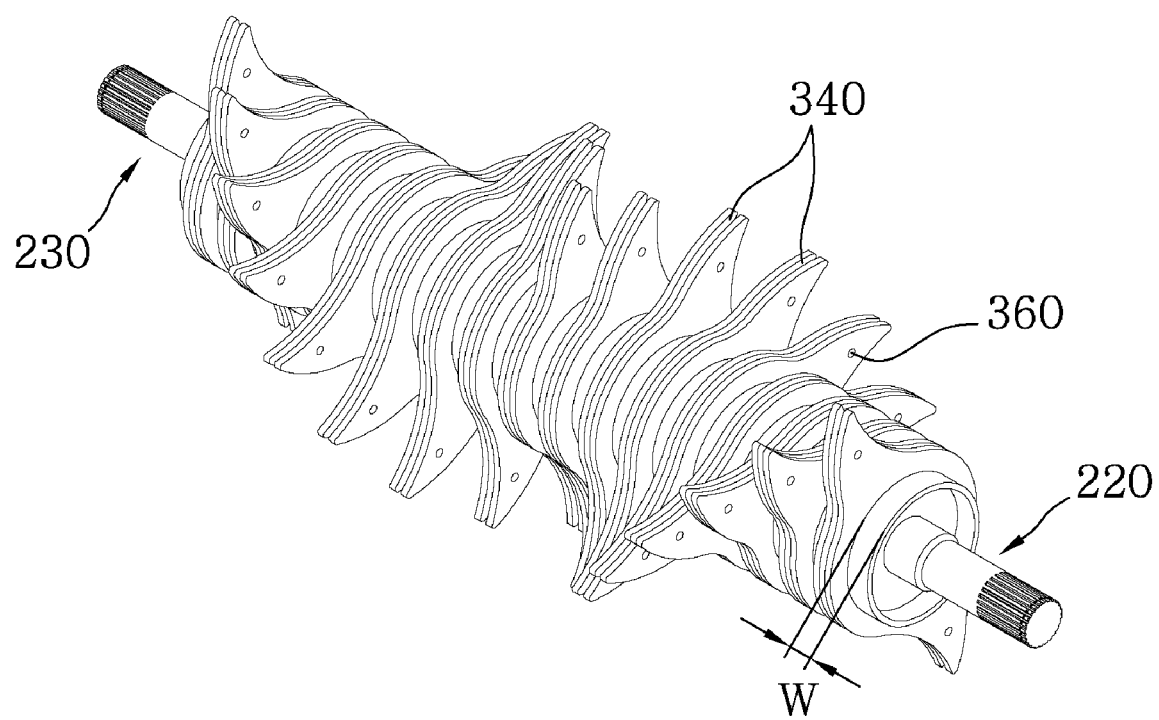
FIG. 9 is a perspective view and a side view showing a sixth embodiment the rotor apparatus for the baler of the present invention.

The arrangement of a sixth embodiment of the hay feeding blade assemblies 300 arranged on the hollow pipe 210 in the rotor apparatus for the baler according to the present invention will be described. As shown in FIG. 9, in addition to the arrangement of the hay feeding blade assemblies 300 of the first to fifth embodiments, each of the hay feeding blade assemblies is provided at the tips thereof with holes 360.

Figure 10:
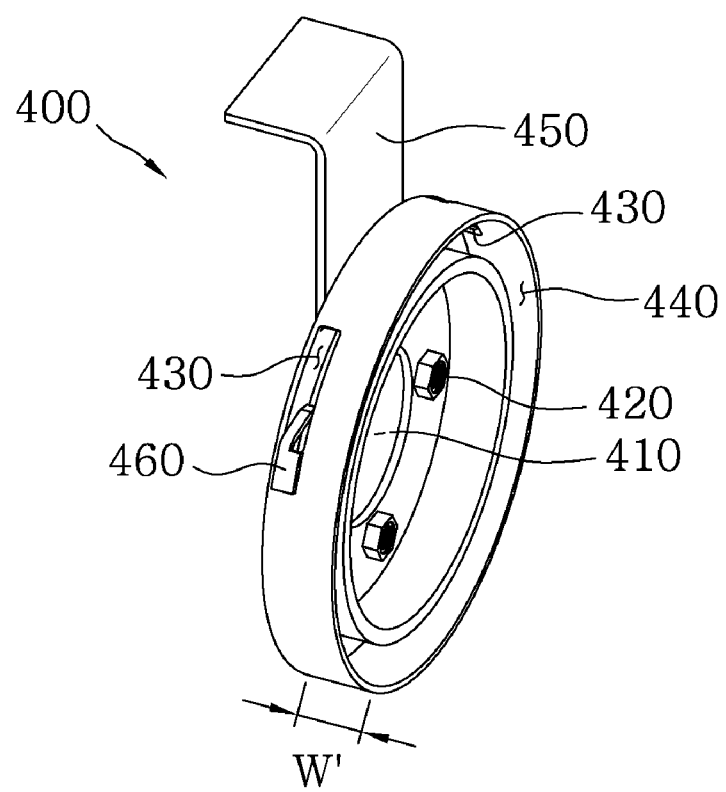
FIG. 10 is a perspective view showing a first embodiment of a foreign substance inflow prevention cover of the rotor apparatus for the baler of the present invention.

As shown in FIG. 10, the foreign substance inflow prevention cover 400 coupled to the margin portion 211 of the present invention has a structure in which a foreign substance outlet 430 is formed on the outer circumferential surface of the foreign substance inflow prevention cover 400 to communicate with the margin portion reception part 440. Accordingly, when foreign substances enter the margin portion 211 and the margin portion reception part 440, the foreign substances are discharged to the foreign substance outlet 430.

Figure 11:
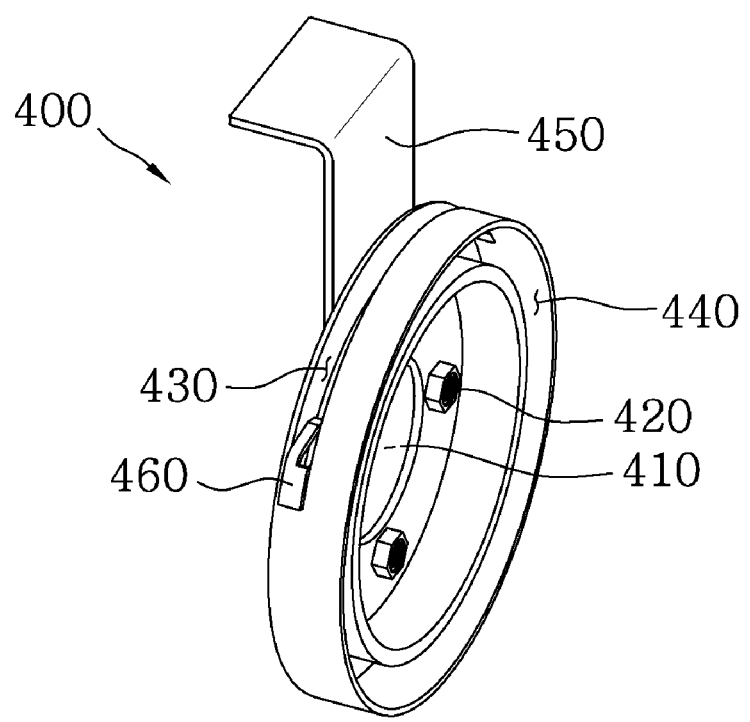
FIG. 11 is a perspective view showing a second embodiment of the foreign substance inflow prevention cover of the rotor apparatus for the baler of the present invention.
Figure 12:
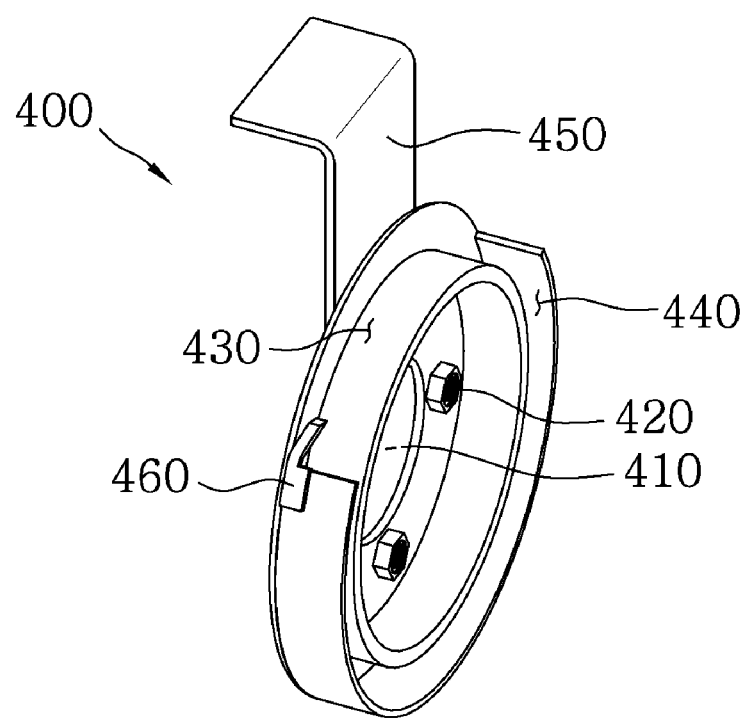
FIG. 12 is a perspective view showing a third embodiment of the foreign substance inflow prevention cover of the rotor apparatus for the baler of the present invention.

Meanwhile, as shown in FIGS. 10 and 11, the foreign substance outlet 430 may be formed as at least one longitudinal hole circumferentially formed on an upper portion of the outer circumferential surface of the foreign substance inflow prevention cover 400, and may be, as shown in FIG. 12, formed as an opening by partially circumferentially cutting the upper portion of the outer circumferential surface of the foreign substance inflow prevention cover 400.

In addition, as shown in FIGS. 10 to 12, the foreign substance outlet 430 is provided at an end thereof with the scraper 460 at a position opposite to a direction in which the hollow pipe 210 rotates, the scraper removing foreign substances existing inside the foreign substance inflow prevention cover 400 and existing between the foreign substance inflow prevention cover and the margin portion.

The reason for this is that when foreign substances existing inside the foreign substance inflow prevention cover 400 and existing between the foreign substance inflow prevention cover and the margin portion are not removed, friction occurs between the fixed foreign substance inflow prevention cover 400 and the hollow pipe 210 of the rotating rotary shaft 200 and thus a load is applied to the rotary shaft 200. In addition, the friction causes heat to be generated and a fire may occur, so it is required to remove the foreign substances existing inside the foreign substance inflow prevention cover 400 and existing between the foreign substance inflow prevention cover and the margin portion.

Meanwhile, the width W of the margin portion 211 as shown in FIG. 9 may be smaller than the depth W' of the margin portion reception part 440 as shown in FIG. 10, such that a front end of the margin portion 211 is prevented from being in contact with an inside end of the margin portion reception part 440. This is to prepare for the case in which the length of the hollow pipe 210 varies.

Figure 13:
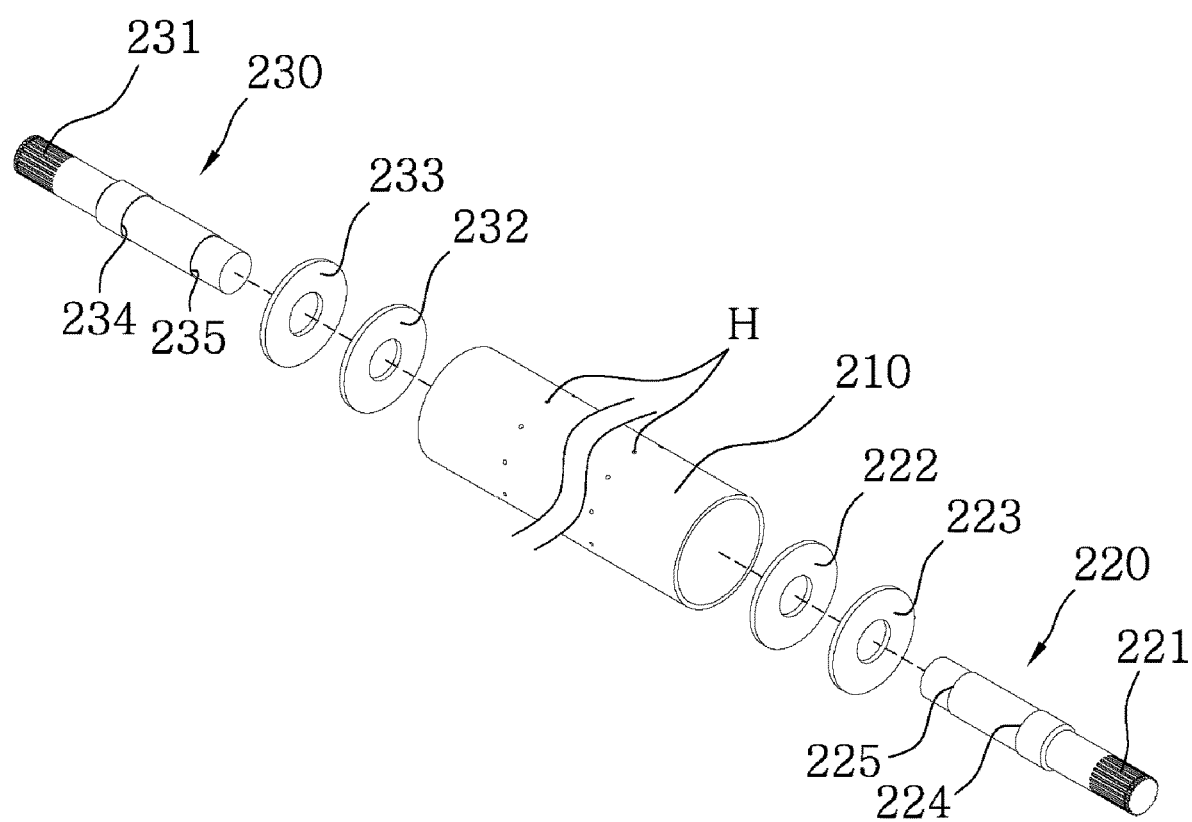
FIG. 13 is an exploded perspective view showing a power input shaft and a power output shaft of the rotor apparatus for the baler of the present invention.
Figure 14:
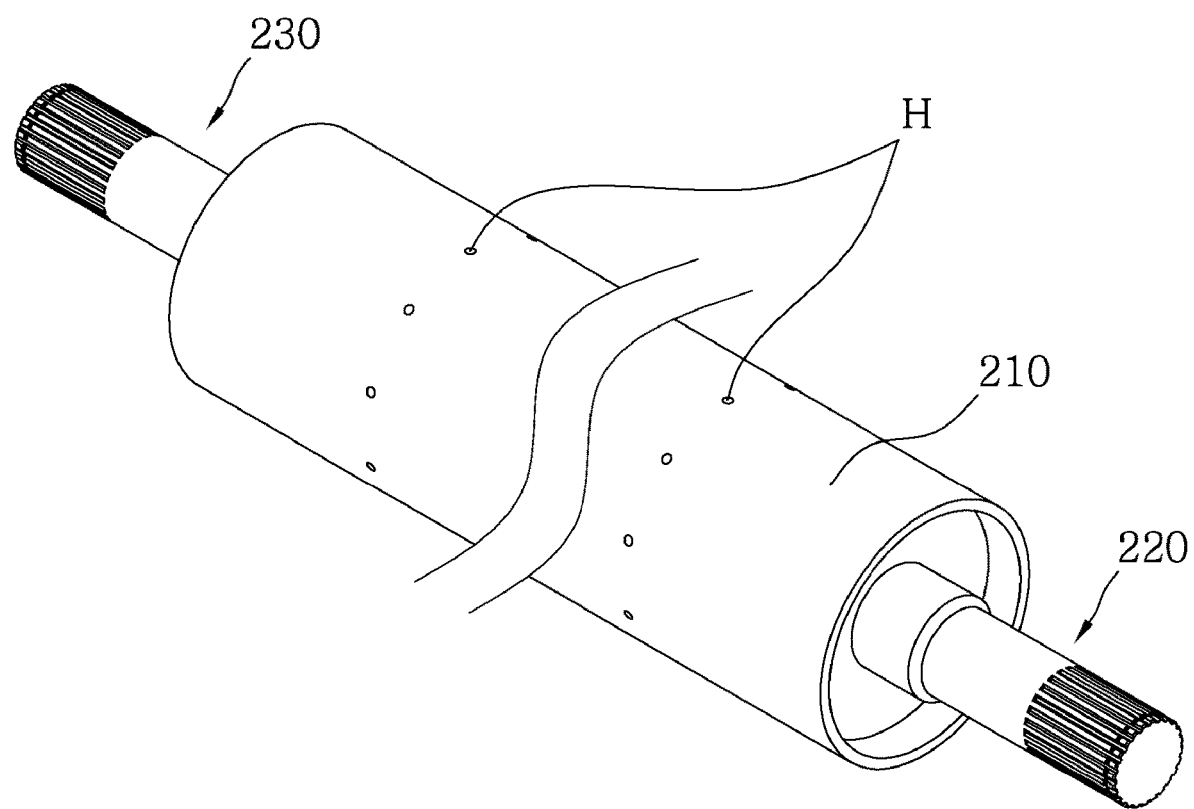
FIG. 14 is a combined perspective view showing the power input shaft and the power output shaft of the rotor apparatus for the baler of the present invention.
Figure 15:
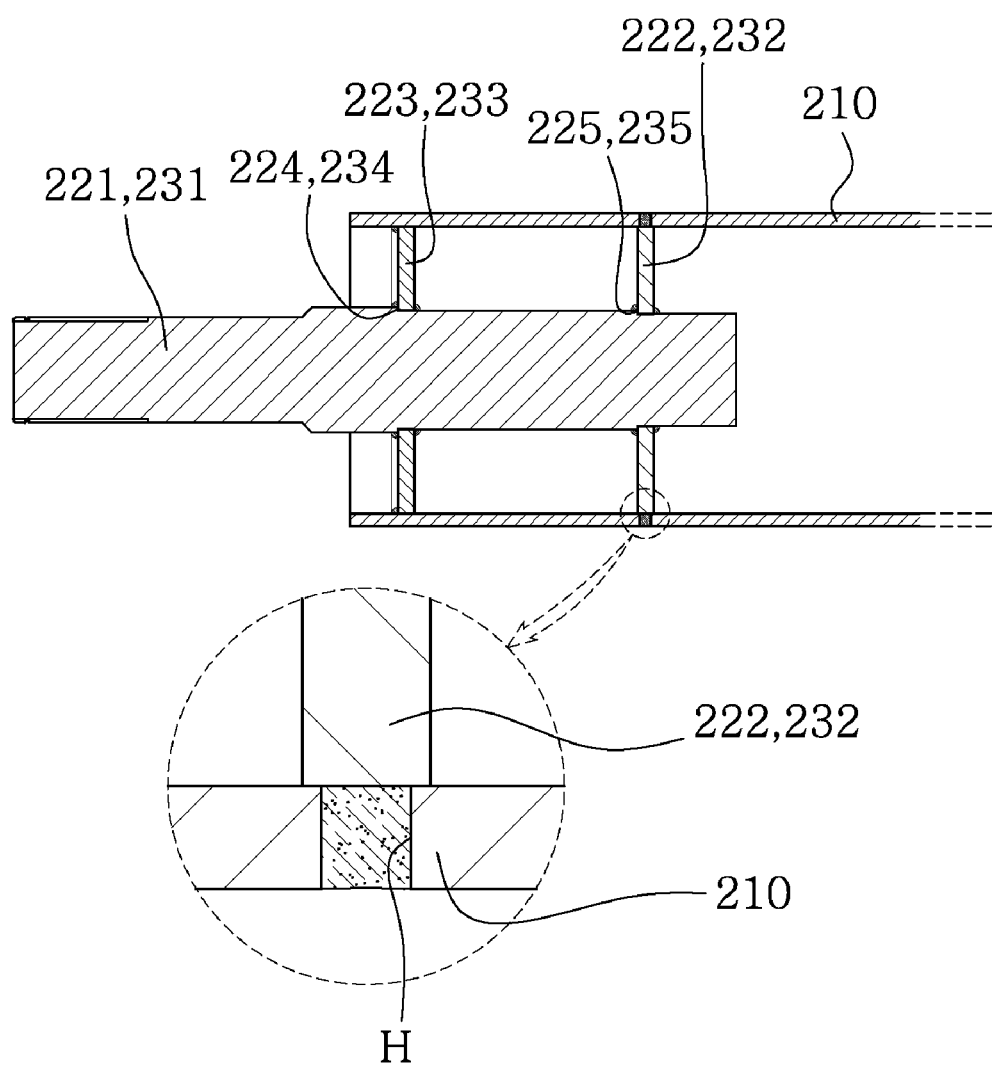
FIG. 15 is a cross-sectional view showing a state in which the power input shaft and the power output shaft are installed at the rotor apparatus for the baler of the present invention.

As shown in FIGS. 13 to 15, inside ends of the power input shaft 220 and the power output shaft 230 of the present invention are partially inserted into the opposite ends of the hollow pipe 210, and the outside ends of the power input shaft 220 and the power output shaft 230 having the spline teeth 221 and 231 are exposed outside. Inside plates 222 and 232 are provided on end portion of the inside ends of the power input shaft 220 and the power output shaft 230 inserted into the opposite ends of the hollow pipe 210, respectively, the inside plates being tightly fitted into the hollow pipe 210. Outside plates 223 and 233 are provided on central portions of the power input shaft 220 and the power output shaft 230, respectively, the outside plates being fitted into the hollow pipe 210 to close the opposite ends of the hollow pipe. Through holes H are formed on the hollow pipe 210 at positions corresponding to the inside plates 222 and 232 such that the inside plates 222 and 232 are fixed to the hollow pipe 210 by welding or using a fixing member, and the outside plates 223 and 233 are fixed to the hollow pipe 210 by welding or using a fixing member.

The inside plates 222 and 232 and the outside plates 223 and 233 may have an outer diameter such that the inner and outside plates are tightly fitted to the inner circumferential surface of the hollow pipe 210. Accordingly, the inside plates 222 and 232, and the outer plates 223 and 233 are tightly fixed to the inner circumferential surface of the hollow pipe 210, whereby the power input shaft 220 and the power output shaft 230 are securely and firmly supported, and the power input shaft 220 and the power output shaft 230 are located in a straight line.

Further, outside plate stop steps 224 and 234 determining fixing positions of the outside plates 223 and 233 are formed at the central portions of the power input shaft 220 and the power output shaft 230, respectively, and inside plate stop steps 225 and 235 determining fixing positions of the inside plates 222 and 232 are formed at the end portions of the inside ends of the power input shaft 220 and the power output shaft 230, respectively. An outer diameter of each of shaft portions from the outside plate stop steps to the inside plates of the power input shaft and the power output shaft may be larger than an outer diameter of each of shaft portions from the inside ends to the inside plate stop steps of the power input shaft and the power output shaft.

Each of the power input shaft 220 and the power output shaft 230 is provided with the outside plate stop steps 224 and 234 and provided with the inside plate stop steps 225 and 235, whereby the outside plates 223 and 233 are accurately and firmly fixed to the outside plate stop steps 224 and 234, and the inside plates 222 and 232 are accurately and firmly fixed to the inside plate stop steps 225 and 235.

Further, an outer diameter of each of shaft portions from the outside plate stop steps 224 and 234 to the inside plates 222 and 232 of the power input shaft 220 the power output shaft 230 may be larger than an outer diameter of each of shaft portions from the inside ends to the inside plate stop steps 225 and 235 of the power input shaft and the power output shaft.

Accordingly, the outside plates 223 and 233 can be efficiently fitted over the shaft until reaching the outside plate stop steps 224 and 234.

As described above, in the rotor apparatus for the baler according to the present invention as described in the above effect, hay on the ground is picked up by the hay pick-up apparatus installed at the side of the baler and the picked-up hay can be fed without being wound around the rotor feeding the hay to the region of the roll forming apparatus, whereby the hay of the hay pick-up apparatus can be fed to the region of the roll forming apparatus quickly, precisely, and evenly. In addition, a load of the rotor can be minimized when the hay is fed to the region of the roll forming apparatus, thereby extending the service life of the rotor.

What is claimed is:

1. A rotor apparatus for a baler, the baler being configured such that hay is picked up from the ground by a hay pick-up apparatus and the picked-up hay is fed to a region of a roll forming apparatus by the rotor apparatus, the rotor apparatus comprising:
    a rotary shaft, the rotary shaft including:
    a power input shaft provided at a first end of a hollow pipe and having a first external spline teeth circumferentially formed at an end portion of the power input shaft, the power input shaft rotating the rotor apparatus by receiving external power; and
    a power output shaft provided at a second end of the hollow pipe and having a second external spline teeth circumferentially formed at an end portion of the power output shaft, the power output shaft transmitting power of the rotor apparatus to outside, wherein
    the hollow pipe is provided at opposite ends thereof with margin portions, respectively, and a plurality of hay feeding blade assemblies each having a plurality of sharp tips are arranged on the hollow pipe at a position between the opposite margin portions such that tips of the plurality of hay feeding blade assemblies are offset from each other with respect to a lengthwise direction of the hollow pipe,
    each of the margin portions provided at the opposite ends of the hollow pipe is coupled with a foreign substance inflow prevention cover preventing hay and foreign substances from invading into the opposite ends of the hollow pipe, and having an opening formed at a central portion thereof, piece holes formed around a periphery of the opening, a margin portion reception part circumferentially formed on an inner surface of the foreign substance inflow prevention cover at a position outside the piece holes, and a bracket installed on an outer surface of the foreign substance inflow prevention cover, and
    a width of the margin portion is less than a depth of the margin portion reception part such that a front end of the margin portion is prevented from being in contact with an inside end of the margin portion reception part.

2. The rotor apparatus of claim 1, wherein each end portion of the plurality of hay feeding blade assemblies, arranged at respective of opposite outermost sides of the hollow pipe, includes a single hay feeding blade, and each of remaining portion of the plurality of hay feeding blade assemblies includes two hay feeding blades facing each other, respectively, and has a space therebetween.

3. The rotor apparatus of claim 2, wherein a thickness of the single hay feeding blade arranged at each of the opposite outermost sides of the hollow pipe is greater than a thickness of either one of the two hay feeding blades of the remaining portion of the plurality of hay feeding blade assemblies.

4. The rotor apparatus of claim 1, wherein the plurality of hay feeding blade assemblies, arranged on each portion of the hollow pipe at the position between the opposite margin portions, include two hay feeding blades having the same size and shape and facing each other and have a space therebetween.

5. The rotor apparatus of claim 4, wherein the space of the hay feeding blades of each of the plurality of hay feeding blade assemblies arranged at the opposite outermost sides of the hollow pipe is partially closed by tip reinforcing holders at positions around each of the tips.

6. The rotor apparatus of claim 1, wherein each end portion of the plurality of hay feeding blade assemblies, arranged at respective of first opposite outermost sides of the hollow pipe, includes two hay feeding blades facing each other and has a first space therebetween,
    a single hay feeding blade arranged at second opposite outermost sides of the hollow pipe, and
    each of intermediate hay feeding blades arranged inside of the single hay feeding blade facing the two hay feeding blades each other and has a second space therebetween.

7. The rotor apparatus of claim 6, wherein a plurality of tip reinforcing holders partially close the spaces defined between the hay feeding blades of the plurality of hay feeding blade assemblies arranged at the opposite outermost sides of the hollow pipe at positions around the tips, and partially alternately close the spaces defined between the hay feeding blades of intermediate hay feeding blade assemblies at positions around the tips.

8. The rotor apparatus of claim 1, wherein the sharp tips of the plurality of hay feeding blade assemblies are formed with at least one of oppositely directed two tips, three tips forming a triangle, and four tips forming a square.

9. The rotor apparatus of claim 1, wherein each tip portion of the plurality of hay feeding blade assemblies includes a hole.

10. The rotor apparatus of claim 1, further comprising:
    a foreign substance outlet communicating with the margin portion reception part being provided at an outer circumferential surface of the foreign substance inflow prevention cover.

11. The rotor apparatus of claim 10, wherein the foreign substance outlet is formed with one of longitudinal hole circumferentially formed on an upper portion of the outer circumferential surface of the foreign substance inflow prevention cover or an opening formed by partially circumferentially cutting an upper portion of the outer circumferential surface of the foreign substance inflow prevention cover.

12. The rotor apparatus of claim 11, further comprising:
    a scraper removing foreign substances being provided at inside of the foreign substance inflow prevention cover and being provided between the foreign substance inflow prevention cover and the margin portion.

13. The rotor apparatus of claim 1, wherein
    inside ends of the power input shaft and the power output shaft are partially inserted into the opposite ends of the hollow pipe, and the outside ends of the power input shaft and the power output shaft having the first and second external spline teeth are exposed outside,
    inside plates are provided on end portions of the inside ends of the power input shaft and the power output shaft that are inserted into the opposite ends of the hollow pipe, respectively, the inside plates being tightly fitted into the hollow pipe,
    outside plates are provided on central portions of the power input shaft and the power output shaft, respectively, the outside plates fitted into the hollow pipe to close the opposite ends of the hollow pipe, and
    through holes are formed on the hollow pipe at positions corresponding to the inside plates such that the inside plates are fixed to the hollow pipe by welding or using a fixing member, and the outside plates are fixed to the hollow pipe by welding or using the fixing member.

14. The rotor apparatus of claim of 13, wherein
outside plate stop steps determining fixing positions of the outside plates are formed at the central portions of the power input shaft and the power output shaft, respectively,
inside plate stop steps determining fixing positions of the inside plates are formed at the end portions of the inside ends of the power input shaft and the power output shaft, respectively, and
an outer diameter of each of shaft portions from the outside plate stop steps to the inside plates of the power input shaft and the power output shaft is greater than an outer diameter of each of shaft portions from the inside ends to the inside plate stop steps of the power input shaft and the power output shaft.

* * * * *